(12) United States Patent
Yeum

(10) Patent No.: US 9,168,616 B2
(45) Date of Patent: Oct. 27, 2015

(54) ROTATING MODULE FOR CLAMPING DEVICE

(75) Inventor: Jung Whan Yeum, Seoul (KR)

(73) Assignee: Hyundai Motor Company, Seoul (KR)

( * ) Notice: Subject to any disclaimer, the term of this patent is extended or adjusted under 35 U.S.C. 154(b) by 742 days.

(21) Appl. No.: 13/558,956

(22) Filed: Jul. 26, 2012

(65) Prior Publication Data

US 2013/0145874 A1 Jun. 13, 2013

(30) Foreign Application Priority Data

Dec. 7, 2011 (KR) .................. 10-2011-0130516

(51) Int. Cl.
| | |
|---|---|
| *B23Q 3/18* | (2006.01) |
| *B23K 37/04* | (2006.01) |
| *B25B 5/00* | (2006.01) |
| *B62D 65/06* | (2006.01) |
| *B62D 21/00* | (2006.01) |

(52) U.S. Cl.
CPC ............ *B23K 37/0443* (2013.01); *B25B 5/006* (2013.01); *B23K 2201/006* (2013.01); *B62D 21/00* (2013.01); *B62D 65/06* (2013.01); *Y10T 74/19614* (2015.01)

(58) Field of Classification Search
CPC combination set(s) only.
See application file for complete search history.

(56) References Cited

U.S. PATENT DOCUMENTS

| | | | | |
|---|---|---|---|---|
| 3,787,000 A | * | 1/1974 | Farnsworth et al. ....... | 242/432.4 |
| 3,844,535 A | * | 10/1974 | Dorough, Jr. ................ | 254/103 |
| 3,959,877 A | * | 6/1976 | Zorzenon ...................... | 30/90.3 |
| 4,486,933 A | * | 12/1984 | Iwase et al. .................. | 29/726 |
| 4,589,184 A | * | 5/1986 | Asano et al. ................. | 29/430 |
| 4,613,034 A | * | 9/1986 | Hibi et al. ................... | 198/465.1 |
| 4,736,515 A | * | 4/1988 | Catena .......................... | 29/714 |
| 5,052,496 A | * | 10/1991 | Albert et al. ................. | 173/29 |
| 5,123,148 A | * | 6/1992 | Ikeda et al. .................. | 29/11 |
| 5,134,874 A | * | 8/1992 | Williams ....................... | 72/449 |
| 5,191,813 A | * | 3/1993 | Havens ....................... | 74/606 R |
| 5,301,411 A | * | 4/1994 | Fujiwara et al. ............. | 29/430 |
| 5,307,676 A | * | 5/1994 | Gutman ........................ | 73/162 |
| 5,718,621 A | * | 2/1998 | Turley .......................... | 451/342 |
| 5,951,434 A | * | 9/1999 | Richards et al. ............. | 475/284 |
| 6,003,224 A | * | 12/1999 | McIntosh et al. ............ | 29/726 |

(Continued)

FOREIGN PATENT DOCUMENTS

| | | | |
|---|---|---|---|
| JP | 2002293277 A | | 10/2002 |
| JP | 2010284795 A | | 12/2010 |

(Continued)

*Primary Examiner* — Lee D Wilson
*Assistant Examiner* — Alvin Grant
(74) *Attorney, Agent, or Firm* — Mintz Levin Cohn Ferris Glovsky and Popeo, P.C.; Peter F. Corless

(57) ABSTRACT

A rotating module for a clamping device is disclosed. More specifically, the rotating module includes a housing including a first connecting section having an end rotatably connected to an upper portion of a base frame and a second connecting section formed vertically to the first connecting section. An end portion of a connecting plate is connected to the second connecting section and a clamping device mounted at the other end of the connecting plate and configured to clamp a panel. A gear unit in the housing is rotated by receiving torque of the operating motor. Clutch units are mounted respectively in the first connecting section and the second connecting section, connected to the gear unit, and configured to selectively transmit torque of the gear unit to the first connecting section or the second connecting section so as to rotate the housing or the connecting plate.

15 Claims, 9 Drawing Sheets

(56) References Cited

U.S. PATENT DOCUMENTS

| | | | |
|---|---|---|---|
| 6,264,211 B1 * | 7/2001 | Granado | 279/143 |
| 6,367,618 B1 * | 4/2002 | Szuba | 198/791 |
| 6,643,905 B2 * | 11/2003 | Rhoads et al. | 29/407.09 |
| 7,178,227 B2 * | 2/2007 | Ghuman et al. | 29/799 |
| 7,802,364 B2 * | 9/2010 | Baulier | 29/897.2 |
| 2005/0106952 A1 * | 5/2005 | Maxwell et al. | 439/761 |
| 2005/0234435 A1 * | 10/2005 | Layer | 606/1 |
| 2006/0081023 A1 * | 4/2006 | Tanimoto | 70/186 |

FOREIGN PATENT DOCUMENTS

| | | | |
|---|---|---|---|
| KR | 10-1995-0014963 | 12/1995 | |
| KR | 10-0494938 | 6/2005 | |
| WO | WO 2006123078 A1 * | 11/2006 | B62D 65/06 |

* cited by examiner

ROTATING MODULE FOR CLAMPING DEVICE

CROSS-REFERENCE TO RELATED APPLICATION

This application claims priority to and the benefit of Korean Patent Application No. 10-2011-0130516 filed in the Korean Intellectual Property Office on Dec. 7, 2011, the entire contents of which are incorporated herein by reference.

BACKGROUND OF THE INVENTION (a) Field of the Invention

The present invention relates to a rotating module for a clamping device. More particularly, the present invention relates to a rotating module applied to a clamping device that is configured to clamp a panel regardless of the dimensions and surface curvature of the panel which may have different sizes and shapes according to vehicle models.

(b) Description of the Related Art

Generally, twenty to thirty thousand components are sequentially assembled so that a vehicle can be efficiently manufactured on an assembly line. Particularly, after being manufactured through various press apparatuses, the panels are transmitted to a vehicle body factory at a first stage of vehicle manufacturing process. The panels are assembled with each other to form a vehicle body of a body in white (B.I.W) shape.

A side panel, a roof panel, a rear panel, and so on are mounted to a floor of the vehicle body through main body processes, the vehicle body is painted through painting processes, and the vehicle is manufactured by assembling an engine, a transmission, and interior and exterior materials thereto in an assembly factory.

Each panel mounted on the vehicle body is manufactured generally via pressing. After the panels are pressed, the panels are clamped, assembled, welded, hemmed, and painted to output a manufactured vehicle body.

Since the different panels, however, have different shapes and sizes depending on the vehicle model currently being manufactured, it is difficult to use a universal apparatus that is able to effectively clamp all kinds of panels each having different dimensions and shapes. Therefore, manufactures must use custom clamping apparatuses for each vehicle model.

When a custom clamping apparatus is used, cost for remodeling the clamping apparatus or manufacturing a new clamping apparatus may be necessary and initial investment cost may be increased when a new vehicle model is manufactured. In addition, structure of the clamping apparatus may become complex as well.

In some cases, in order to clamp various different kinds of panels of different vehicle models having various dimensions using a conventional clamping device, the clamping device can rotate forward or backward and to the left or to the right. In this case, each driving module should be provided for each axial direction. Therefore, the structure and control of the driving module may become complex in the conventional designs.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a clamping device that is configured to rotate about two axes using one motor to clamp panels regardless of the panels respective dimension, shape, size and surface curvature.

A rotating module for a clamping device according to an exemplary embodiment of the present invention may include: a base frame; a housing formed with a mounting space therein, and provided with a first connecting section having an end rotatably connected to an upper portion of the base frame and a second connecting section formed vertically to the first connecting section; a connecting plate having an end portion connected to the second connecting section; a clamping device mounted at the other end of the connecting plate and configured to clamp a panel; an operating motor having a rotational shaft; a gear unit mounted to correspond with the first and second connecting sections and the rotational shaft of the operating motor in the mounting space of the housing, and configured to be rotated by receiving torque from the operating motor; and one or more clutch units mounted respectively in the first connecting section and the second connecting section, connected to the gear unit, and configured to selectively transmit torque of the gear unit to the first connecting section or the second connecting section to rotate the housing or the connecting plate.

The gear unit may include: a driving bevel gear connected to the rotational shaft of the operating motor; a first driven bevel gear engaged with the driving bevel gear and selectively connected to the first connecting section by at least one of the one or more clutch units; and a second driven bevel gear disposed vertically to the first driven bevel gear, engaged with the driving bevel gear, and selectively connected to the second connecting section by the clutch unit.

The driving bevel gear may be configured to rotate about a first axis and the first driven bevel gear may be engaged with the driving bevel gear so as to rotate about a second axis that is vertical to the first axis. The second driven bevel gear may be engaged with the driving bevel gear to rotate about a third axis that is vertical to the first axis and the second axis.

At least one clutch unit may include: an electromagnet assembly configured to generate an electromagnetic force by receiving current therein; an operating shaft rotatably inserted in the electromagnet assembly, and having an end at which the first driven bevel gear or the second driven bevel gear is mounted and the other end at which the first coupling portion is formed; a fixed rotator positioned separated from the other end of the operating shaft, rotatably mounted at the electromagnet assembly, and having an end at which the second coupling portion is formed and the other end fixed to the base frame or the connecting plate; a connector rotatably and slidably inserted in the fixed rotator, and configured to slide on the fixed rotator by the electromagnetic force of the electromagnet assembly to selectively connect the first coupling portion to the second coupling portion; and an elastic member interposed between the fixed rotator and the connector and configured to exert elastic force on the connector. The elastic member may be a circular plate spring, for example.

The rotating module may further include a flange formed at the other end of the operating shaft and configured to prevent the operating shaft from escaping from the electromagnet assembly.

The first coupling portion may be protruded from the other end of the operating shaft toward the fixed rotator by a predetermined length. Further, a bearing may be interposed between the fixed rotator and the electromagnet assembly.

At least two fixing pins may be integrally formed at the other end of the fixed rotator circumferentially and the fixing pin may be fixed to the base frame or the connecting plate. In addition, the second coupling portion may be protruded from the end of the fixed rotator toward the operating shaft by a predetermined length.

First and second engaging portions may be integrally formed at both end portions of the connector corresponding to the first coupling portion and the second coupling portion. Teeth may be formed at exterior circumferences of the first and second coupling portions. The engaging portions may be formed at interior circumferences of the both end portions of the connector to be engaged with the teeth at the exterior circumferences of the coupling portions.

The first connecting section may be connected to the base frame through a fixing plate, and a bearing may be interposed between the fixing plate and the first connecting section.

DESCRIPTION OF SYMBOLS

Figure 1:
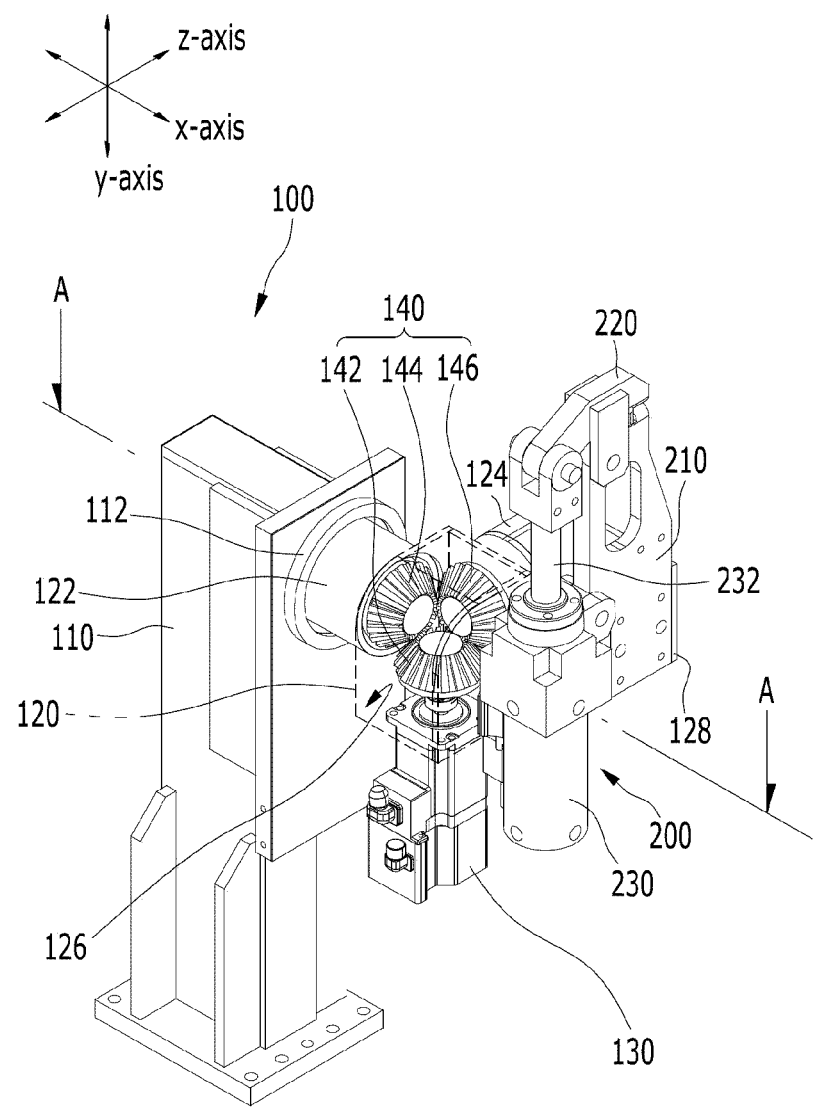
FIG. 1 is a perspective view of a rotating module for a clamping device according to an exemplary embodiment of the present invention.

110: base frame
112: fixing plate
120: housing
122: first connecting section
124: second connecting section
126: mounting space
128: connecting plate
130: operating motor
140: gear unit
142: driving bevel gear
144: first driven bevel gear
146: second driven bevel gear
150: clutch unit
152: electromagnet assembly
154: operating shaft
156: first coupling portion
158: flange
162: fixed rotator
164: second coupling portion
166: fixing pin
168: connector
172: first engaging portion
174: second engaging portion
176: elastic member
200: clamping unit
210: locator
220: clamper
230: operating cylinder
232: operating rod

DETAILED DESCRIPTION OF THE EMBODIMENTS

An exemplary embodiment of the present invention will hereinafter be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Exemplary embodiments described in this specification and drawings are just exemplary embodiments of the present invention. It is to be understood that there can be various modifications and equivalents included in the spirit of the present invention at the filing of this application.

Figure 2:
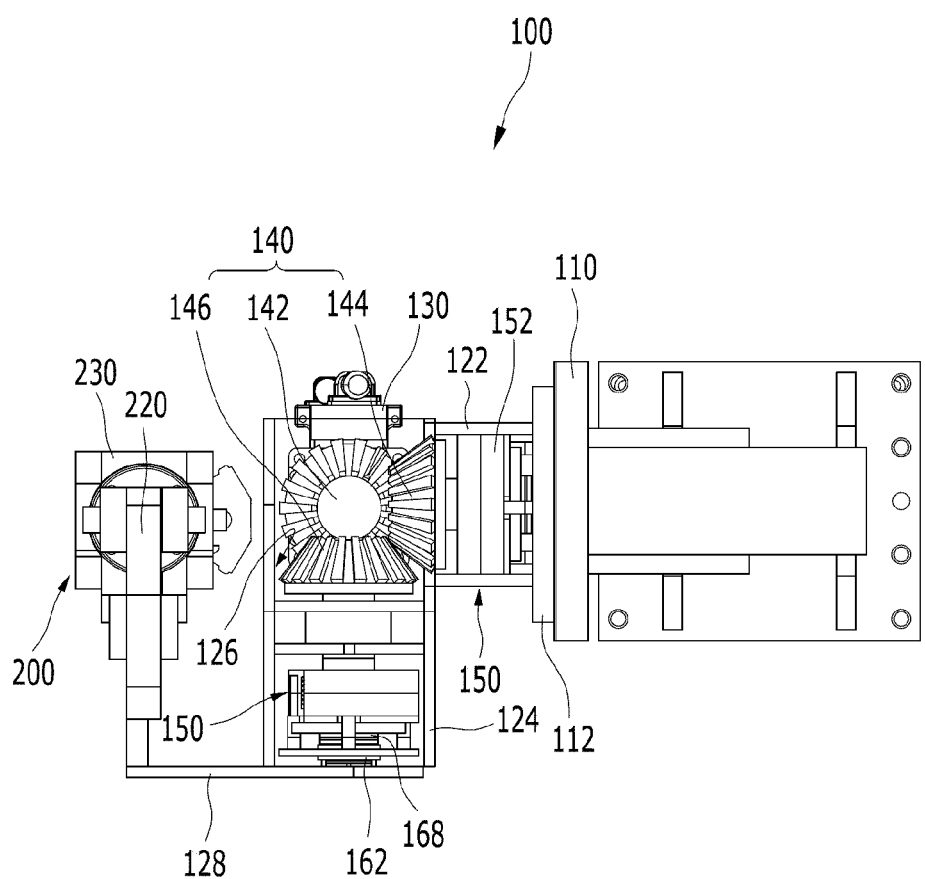
FIG. 2 is a top plan view of a rotating module for a clamping device according to an exemplary embodiment of the present invention.
Figure 3:
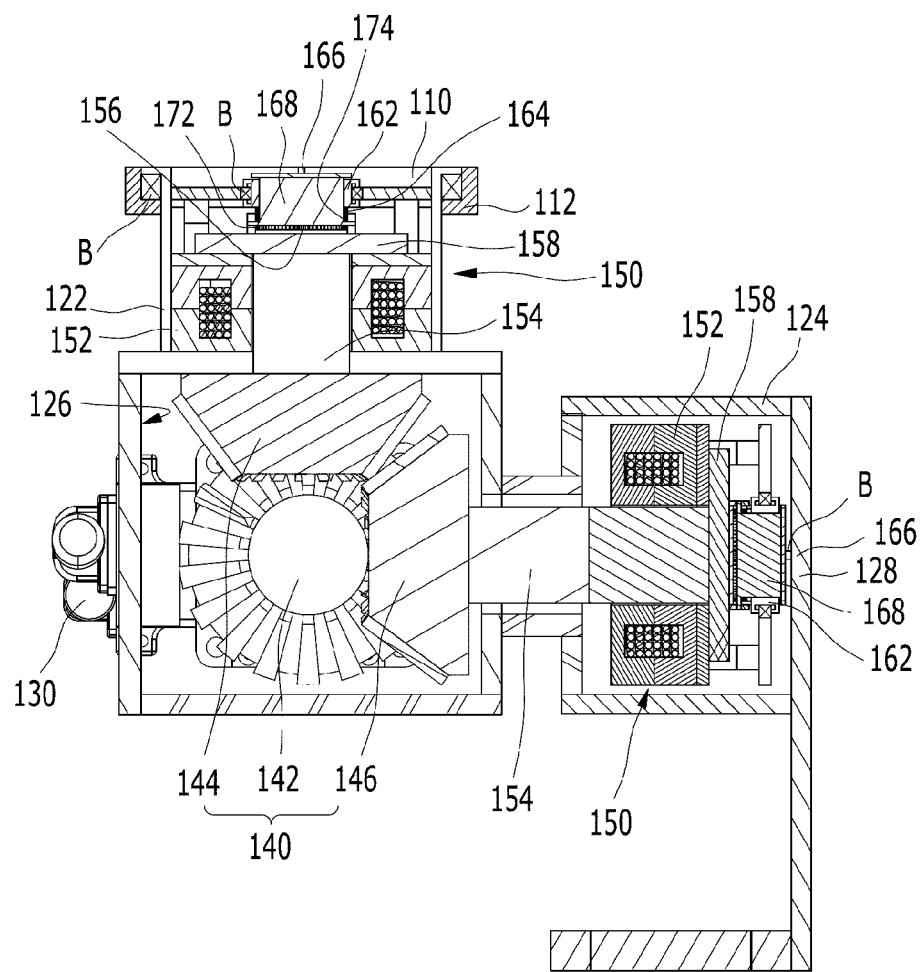
FIG. 3 is a cross-sectional view of a rotating module for a clamping device according to an exemplary embodiment of the present invention.
Figure 4:
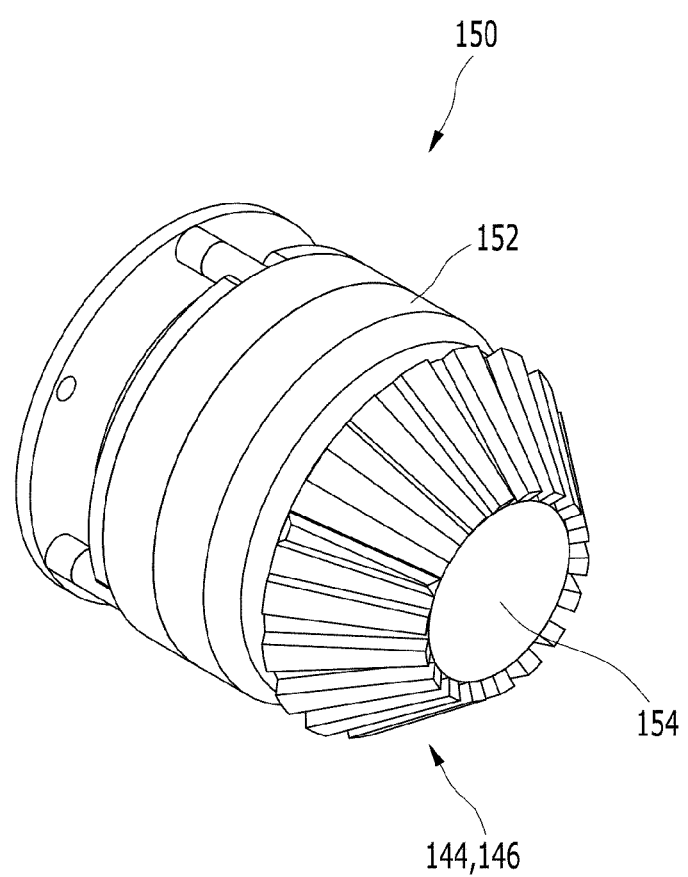
FIG. 4 is a perspective view of a clutch unit applied to a rotating module for a clamping device according to an exemplary embodiment of the present invention.
Figure 5:
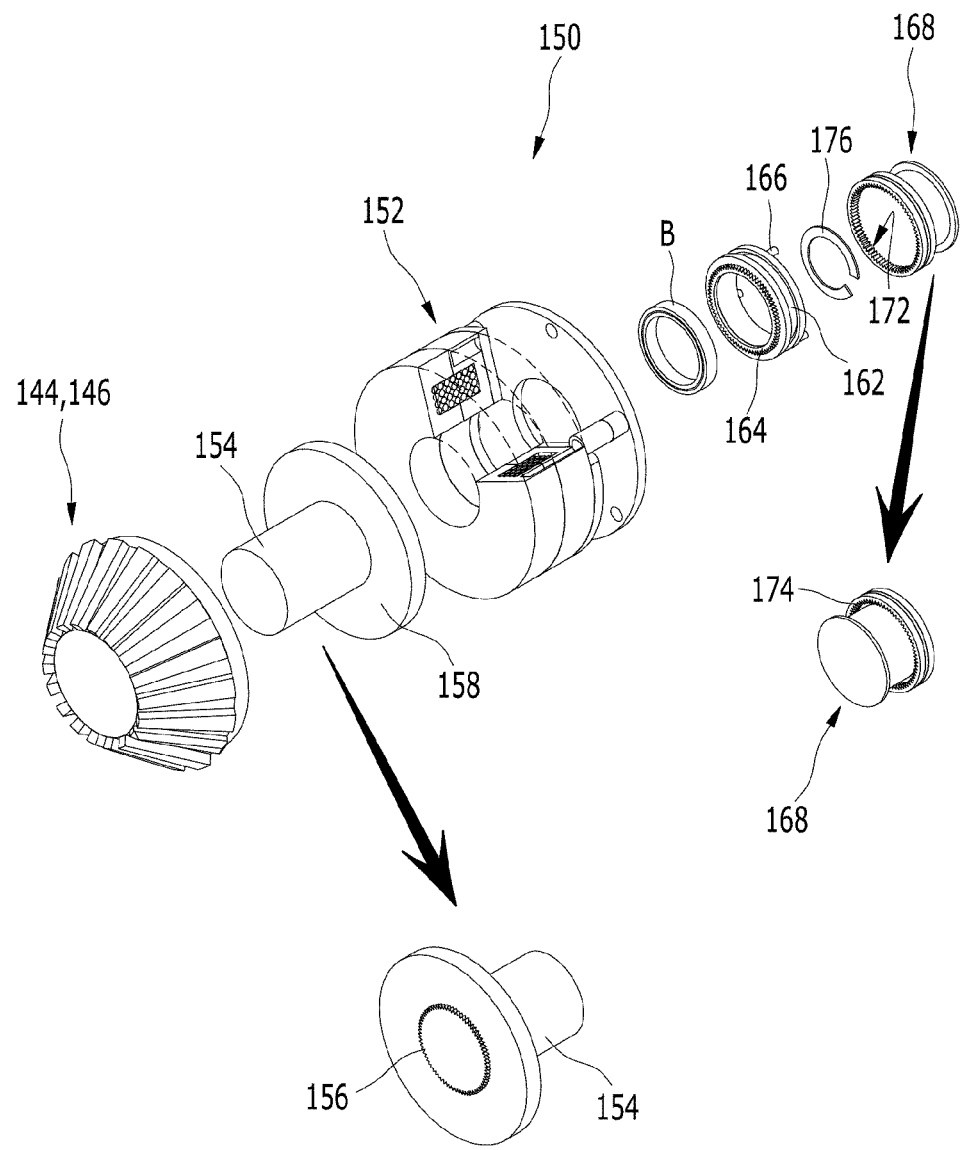
FIG. 5 is an exploded perspective view of a clutch unit applied to a rotating module for a clamping device according to an exemplary embodiment of the present invention.
Figure 6:
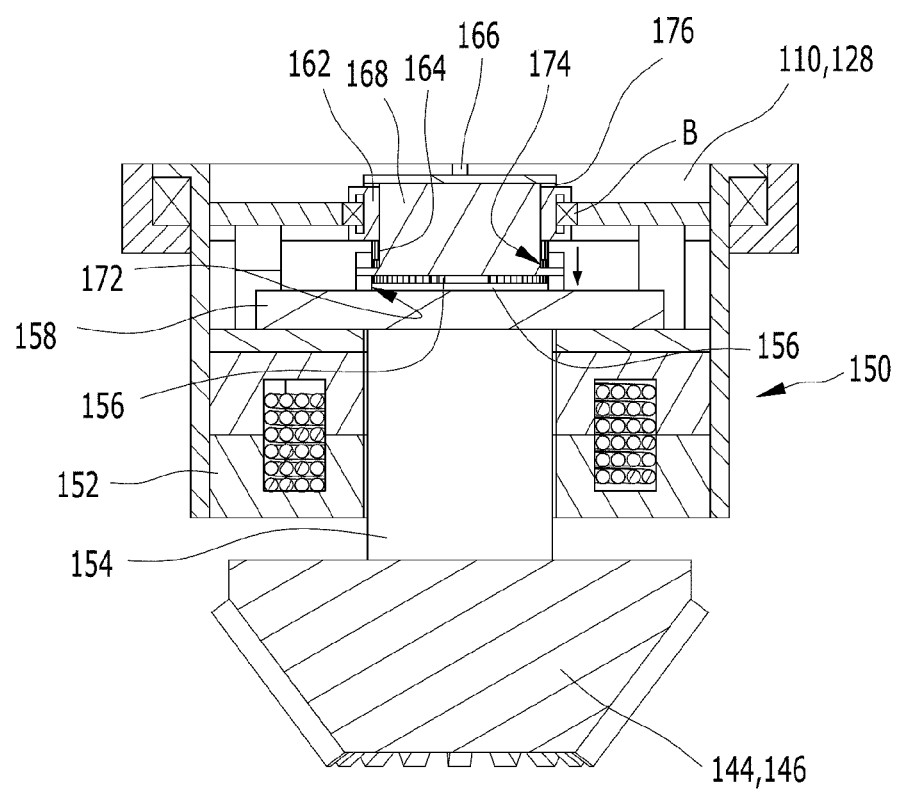
FIG. 6 is a cross-sectional view of a clutch unit applied to a rotating module for a clamping device according to an exemplary embodiment of the present invention.

FIG. 1 is a perspective view of a rotating module for a clamping device according to an exemplary embodiment of the present invention; FIG. 2 is a top plan view of a rotating module for a clamping device according to an exemplary embodiment of the present invention; FIG. 3 is a cross-sectional view of a rotating module for a clamping device according to an exemplary embodiment of the present invention; FIG. 4 is a perspective view of a clutch unit applied to a rotating module for a clamping device according to an exemplary embodiment of the present invention; FIG. 5 is an exploded perspective view of a clutch unit applied to a rotating module for a clamping device according to an exemplary embodiment of the present invention; and FIG. 6 is a cross-sectional view of a clutch unit applied to a rotating module for a clamping device according to an exemplary embodiment of the present invention.

Referring to the drawings, a rotating module 100 for a clamping device according to an exemplary embodiment of the present invention is configured to rotate the clamping device about two axes using one motor to clamp panels regardless of their respective dimensions, shape, size and surface curvature due to, e.g., a change in vehicle model. Therefore, the rotating module 100 for the clamping device can be applied to panels of various vehicle models universally.

For these purposes, the rotating module 100 for the clamping device according to an exemplary embodiment of the present invention, as shown in FIG. 1 to FIG. 3, includes a base frame 110, a housing 120, an operating motor 130, a gear unit 140, and a clutch unit 150. The base frame 110 may be mounted on a floor of a workshop and is generally movable by a moving unit (not shown).

According to the present exemplary embodiment, the housing 120 may be provided with a mounting space 126 formed therein and may include a first connecting section 122 and a second connecting section 124. An end of the first connecting section 122 may be rotatably connected to an upper portion of the base frame 110 and is protruded from the housing 120. The second connecting section 124 may be protruded from the housing 120 and may be disposed in a vertical manner to the first connecting section 122. Herein, the first connecting section 122 is connected to the base frame 110 through a fixing plate 112, and a bearing B is interposed between the fixing plate 112 and the first connecting section 122. When the first connecting section 122 rotates with respect to the base frame 110, the bearing B stably supports rotation of the first connecting section 122.

In some exemplary embodiments of the present invention, the first connecting section 122 and the second connecting section 124 may have cylindrical shapes and may be mounted at a surface and a neighboring surface of the housing 120 perpendicularly to each other.

The operating motor 130 may be mounted at a lower exterior of the housing 120, and a rotational shaft of the operating motor 130 penetrates the housing 120 so as to be inserted in the mounting space 126. Herein, the operating motor 130 may be, for example, a servo motor in which the rotation speed and rotating direction of the operating motor 13 can be controlled.

According to the present exemplary embodiment, the gear unit 140 may be mounted to correspond with the first and second connecting sections 122 and 124 and the operating motor 130 in the mounting space 126 of the housing 120. The gear unit 140 may be rotated by receiving torque from the operating motor 130.

In the illustrative embodiment of the present invention, the gear unit 140 includes a driving bevel gear 142, a first driven bevel gear 144, and a second driven bevel gear 146. The driving bevel gear 142 may be connected to the rotational shaft of the operating motor 130 and may be positioned at a lower portion in the mounting space 126 of the housing 120. The first driven bevel gear 144 may be disposed toward the first connecting section 122 on the driving bevel gear 142 and may engage with the driving bevel gear 142. In addition, the second driven bevel gear 146 may be disposed toward the second connecting section 124 on the driving bevel gear 142 and may engage with the driving bevel gear 142.

Herein, the first driven bevel gear 144 is disposed vertically to the driving bevel gear 142. That is, the first driven bevel gear 144 is engaged to the driving bevel gear 142 on X-axis facing toward the base frame 110. In addition, the second driven bevel gear 146 may be disposed vertically to the driving bevel gear 142. That is, the second driven bevel gear 146 may engage with the driving bevel gear 142 in Z-axis vertical to X-axis.

In addition, the driving bevel gear 142 may be disposed at a lower portion of the housing 110 and may be disposed vertically to the first and second driven bevel gears 144 and 146. That is, the driving bevel gear 142 may engaged with the first and second driven bevel gears 144 and 146 along the Y-axis. Therefore, when the driving bevel gear 142 is rotated by the operating motor 130, the first and second driven bevel gears 144 and 146 engaged with the driving bevel gear 142 rotate respectively about X-axis and Z-axis.

Furthermore, the clutch unit 150 may be mounted in the first connecting section 122 and the second connecting section 124 and are connected to the gear unit 140, respectively. Although the illustrative embodiment of the present invention is described as including only one clutch unit 150, the illustrative embodiment of the present invention may also include a plurality of clutch units.

The clutch unit 150 may selectively deliver torque of the gear unit 140 rotated by the operating motor 130 to the first connecting section 122 or the second connecting section 124. Therefore, the housing 120 is rotated with respect to the base frame 110 or a connecting plate 128 having an end portion connected to the second connecting section 124 is rotated by rotation of the first connecting section 122. At this time, the housing 120 rotates about X-axis by rotation of the first connecting section 122. In addition the connecting plate 128 rotates about Z-axis by operation of the clutch unit 150.

In some illustrative embodiments of the present invention, the clamping device 200 for clamping the panel may be mounted at the other end of the connecting plate 128. The clamping device 200 may include a locator 210 having a side connected to the other end of the connecting plate 128, a damper 220 having a side hinged to a front end of the locator 210, an operating rod 232 hinged to the other end of the clamper 220, and an operating cylinder 230 having a side hinged to the locator 210.

According to the present exemplary embodiment, the clutch unit 150, as shown in FIG. 4 to FIG. 6, includes an electromagnet assembly 152, an operating shaft 154, a fixed rotator 162, a connector 168 and an elastic member 176, e.g., a circular plate spring. The electromagnet assemblies 152 are mounted respectively in the first connecting section 122 and the second connecting section 124, and when current is applied to the electromagnet assembly 152, the electromagnet assembly 152 generates an electromagnetic force.

According to the present exemplary embodiment, the operating shaft 154 may be rotatably inserted in the electromagnet assembly 152, and have an end at which the driven bevel gears 144 and 146 may be mounted and an other end at which a first coupling portion 156 may be formed.

In the illustrative embodiment of the present invention, a flange 158 is integrally formed at the other end of the operating shaft 154. The flange 158 prevents the operating shaft 154 from escaping from the electromagnet assembly 152. In addition, the first coupling portion 156 is illustratively protruded from the other end of the operating shaft 154 toward the fixed rotator 162 by a predetermined length. Further, teeth are formed at an exterior circumference of the first coupling portion 156.

According to the present exemplary embodiment, the fixed rotator 162 is positioned apart from the other end of the operating shaft 154 and is rotatably mounted at the electromagnet assembly 152.

A second coupling portion 164 may be formed at an end of the fixed rotator 162, and the other end of the fixed rotator 162 may be fixed to the base frame 110 or the connecting plate 128. That is, the fixed rotator 162 may be fixed to the base frame 110 or the connecting plate 128 in the first connecting section 122 or the second connecting section 124.

Herein, a bearing B illustratively depicted as being interposed between the fixed rotator 162 and the electromagnet assembly 152, the fixed rotator 162 rotates stably with reference to the electromagnet assembly 152. In addition, at least two fixing pins 166 may be integrally formed at the other end of the fixed rotator 162 circumferentially. The fixing pin 166 may be fixed to the base frame 110 or the connecting plate 128.

According to the present exemplary embodiment, three fixing pins 166 may be formed at the other end of the fixed rotator 162 circumferentially apart from each other. Meanwhile, the second coupling portion 164 is protruded from the end of the fixed rotator 162 toward the operating shaft 154 by a predetermined length. Teeth are formed at an exterior circumference of the second coupling portion 164.

According to the present exemplary embodiment, the connector 168 is rotatably and slidably inserted in the fixed rotator 162. The connector 168 is configured to slide on the fixed rotator 162 by the electromagnetic force of the electromagnet assembly 152 to selectively connect the first coupling portion 156 to the second coupling portion 164.

Herein, first and second engaging portions 172 and 174 are integrally formed at both end portions of the connector 168 corresponding to the first coupling portion 156 and the second coupling portion 164. The engaging portions 172 and 174 are formed at interior circumferences of the both end portions of the connector 168 so as to be engaged with the exterior circumferences of the coupling portions 156 and 164, and correspond to the teeth of the first and second coupling portions 156 and 164.

Herein, the second engaging portion 174 is always engaged to the second coupling portion 164 of the fixed rotator 162. That is, when the electromagnetic force is generated by the electromagnet assembly 152 in a state that the connector 168 is inserted in the fixed rotator 162, the connector 168 moves toward the operating shaft 154 and the first engaging portion 172 is engaged to the first coupling portion 156. Therefore, the connector 168 receives the torque of the operating shaft 154 rotated by the gear unit 140 and rotates.

At this time, since the second engaging portion 174 of the connector 168 is always engaged to the second coupling portion 164 of the fixed rotator 162, the fixed rotator 162 is rotated with the connector 168. Therefore, the connector 168 selectively connects the operating shaft 154 rotated by the gear unit 140 to the fixed rotator 162 by the electromagnetic force of electromagnet assembly 152. That is, the connector 168 rotates the first connecting section 122 with reference to base frame 110 to rotate the housing 120 about X-axis or rotate the connecting plate 128 about Z-axis. Therefore, angles of the clamping device 200 along two axes can be controlled.

According to the present exemplary embodiment, the elastic member 176 may be interposed between the fixed rotator 162 and the connector 168 and exerts elastic force on the connector 168. When the electromagnetic force is not generated by the electromagnet assembly 152, the elastic member 176 slides the connector 168 to an opposite side from the operating shaft 154 such that the first engaging portion 172 of the connector 168 is not engaged to the first coupling portion 156. Therefore, the operating shaft 154 and the connector 168 are not operably coupled. Herein, the elastic member 176 may be a circular plate spring.

Hereinafter, operation and function of the rotating module 100 for the clamping device according to an exemplary embodiment of the present invention will be described in detail.

Figure 7:
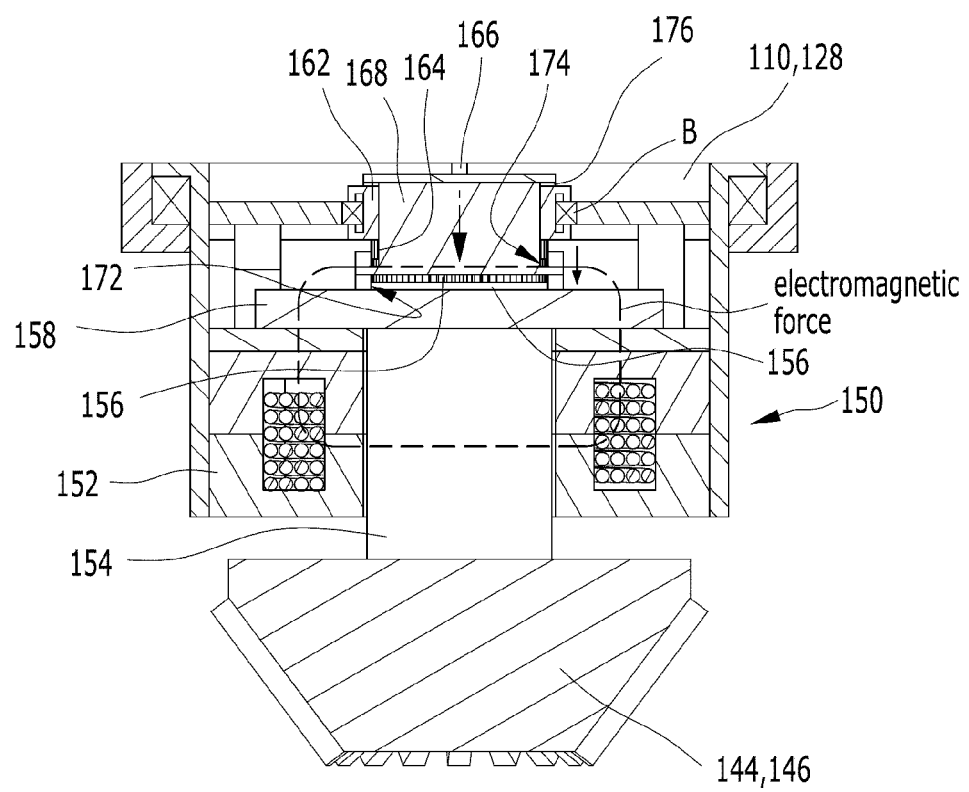
FIG. 7 and FIG. 8 are cross-sectional views for showing operation of a clutch unit applied to a rotating module for a clamping device according to an exemplary embodiment of the present invention.
Figure 8:
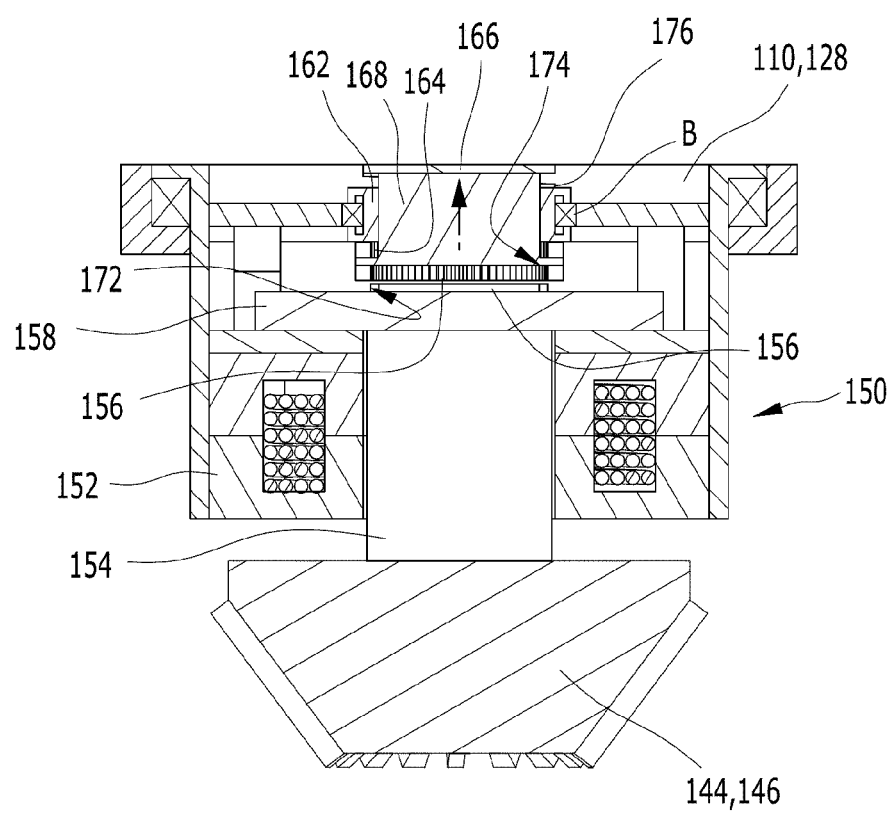
Figure 9:
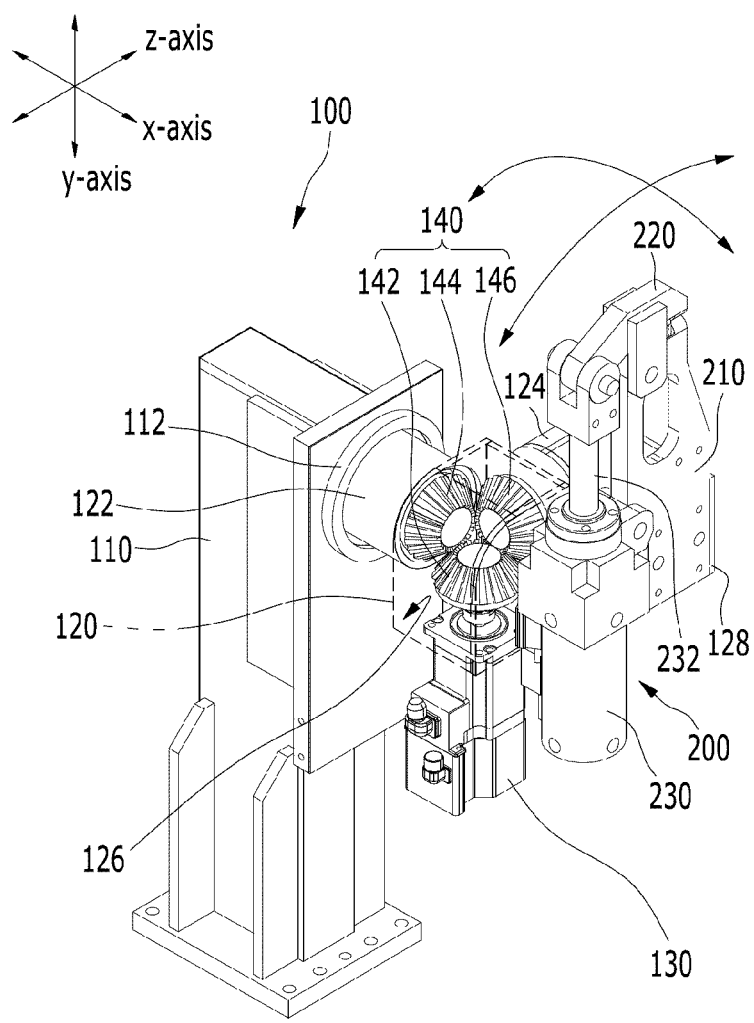
FIG. 9 is a schematic diagram for showing operation of rotating module for a clamping device according to an exemplary embodiment of the present invention.

FIG. 7 and FIG. 8 are cross-sectional views for showing operation of a clutch unit applied to a rotating module for a clamping device according to an exemplary embodiment of the present invention, and FIG. 9 is a schematic diagram for showing operation of rotating module for a clamping device according to an exemplary embodiment of the present invention.

When current is not applied to the electromagnet assembly 152 and the electromagnetic force is not generated, the connector 168 moves to the opposite side from the operating shaft 154 by the elastic member 176 and the operating shaft 154 and the connector 168 are not operably coupled, as shown in FIG. 7. In this case, the second engaging portion 174 of the connector 168 and the second coupling portion 164 of the fixed rotator 162 are engaged accordingly.

When the operating motor 130 rotates in this manner, the driven bevel gears 144 and 146 engaged to the driving bevel gear 142 rotate the operating shaft 154. However, the torque of the operating shaft 154 is not delivered to the fixed rotator 162. Therefore, the clamping unit 200 maintains an initial state.

When current, on the contrary, is applied to the electromagnet assembly 152 and the electromagnetic force is generated, the connector 168 slides toward the operating shaft 154 by the electromagnetic force, as shown in FIG. 8. The first and second engaging portions 172 and 174 of the connector 168 engage respectively with the first and second coupling portions 156 and 164.

When the operating motor 130 is rotated in this manner, driven bevel gears 144 and 146 engaged to the driving bevel gear 142 rotate the operating shaft 154. Then, the torque of the operating shaft 154 is delivered to the connector 168 through the first coupling portion 156 and the first engaging portion 172 and the connector 168 is rotated. In addition, the torque of the operating shaft 154 is delivered to the fixed rotator 162 through the second coupling portion 164 and the second engaging portion 174 and the fixed rotator 162 is rotated. At this time, the clutch unit 150 provided in the first connecting section 122 rotates the first connecting section 122 about X-axis through the fixed rotator 162 fixed to the base frame 110. Therefore, the housing 120 rotates about X-axis.

Accordingly, the clamping device 200, as shown in FIG. 9, rotates about X-axis and an angle along the X-axis is controlled. The clutch unit 150 provided in the second connecting section 124 rotates the connecting plate 128 connected to the fixed rotator 162 about Z-axis. Therefore, the clamping device 200 rotates about Z-axis and an angle along Z-axis is controlled.

The rotating module 100 for the clamping device according to the present exemplary embodiment is configured to rotate the clamping device 200 about X-axis and Z-axis by using the torque of the one operating motor 130. Therefore, the clamping device 200 can clamp a plurality of different panels having various shapes. Therefore, the rotating module 100 for the clamping device according to an exemplary embodiment of the present invention is configured to rotate the clamping device about two axes using one motor to clamp panels regardless of dimension, size, shape and surface curvature.

Since the clamping unit can be rotated about two axes by driving one motor, the structure of the apparatuses may be simplified and manufacturability may be improved. Furthermore, since the present invention can be used universally for the panels of various vehicle models, the initial investment may be curtailed and structure of entire apparatus may be simplified.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rotating module for a clamping device comprising:
   a base frame;
   a housing formed with a mounting space therein, and provided with a first connecting section having an end rotatably connected to an upper portion of the base frame and a second connecting section formed vertically to the first connecting section;
   a connecting plate having an end portion connected to the second connecting section;
   a clamping device mounted at the other end of the connecting plate and configured to selectively clamp a panel;
   an operating motor having a rotational shaft;

a gear unit mounted to correspond with the first and second connecting sections and the rotational shaft of the operating motor in the mounting space of the housing, and configured to be rotated by receiving torque from the operating motor; and one or more clutch units mounted respectively in the first connecting section and the second connecting section, connected to the gear unit, and configured to selectively transmit torque of the gear unit to the first connecting section or the second connecting section to rotate the housing and the connecting plate, respectively.

2. The rotating module of claim 1, wherein the gear unit comprises:

a driving bevel gear connected to the rotational shaft of the operating motor;

a first driven bevel gear engaged with the driving bevel gear and selectively connected to the first connecting section by the clutch unit; and a second driven bevel gear disposed vertically to the first driven bevel gear, engaged with the driving bevel gear, and selectively connected to the second connecting section by the clutch unit.

3. The rotating module of claim 2, wherein the driving bevel gear rotates about a first axis and the first driven bevel gear is engaged with the driving bevel gear so as to rotate about a second axis that is vertical to the first axis.

4. The rotating module of claim 3, wherein the second driven bevel gear is engaged with the driving bevel gear so as to rotate about a third axis that is vertical to the first axis and the second axis.

5. The rotating module of claim 2, wherein at least one clutch unit comprises:

an electromagnet assembly configured to generate electromagnetic force by receiving current;

an operating shaft rotatably inserted in the electromagnet assembly, and having an end at which the first driven bevel gear or the second driven bevel gear is mounted and the other end at which the first coupling portion is formed;

a fixed rotator positioned apart from the other end of the operating shaft, rotatably mounted at the electromagnet assembly, and having an end at which the second coupling portion is formed and the other end fixed to the base frame or the connecting plate;

a connector rotatably and slidably inserted in the fixed rotator, and configured to slide on the fixed rotator by the electromagnetic force of the electromagnet assembly so as to selectively connect the first coupling portion to the second coupling portion; and an elastic member interposed between the fixed rotator and the connector and configured to exert elastic force on the connector.

6. The rotating module of claim 5, further comprising a flange formed at the other end of the operating shaft and configured to prevent the operating shaft from escaping from the electromagnet assembly.

7. The rotating module of claim 5, wherein the first coupling portion is protruded from the other end of the operating shaft toward the fixed rotator by a predetermined length.

8. The rotating module of claim 5, wherein a bearing is interposed between the fixed rotator and the electromagnet assembly.

9. The rotating module of claim 5, wherein at least two fixing pins are integrally formed at the other end of the fixed rotator circumferentially and the fixing pin is fixed to the base frame or the connecting plate.

10. The rotating module of claim 5, wherein the second coupling portion is protruded from the end of the fixed rotator toward the operating shaft by a predetermined length.

11. The rotating module of claim 5, wherein first and second engaging portions are integrally formed at both end portions of the connector corresponding to the first coupling portion and the second coupling portion.

12. The rotating module of claim 6, wherein teeth are formed at exterior circumferences of the first and second coupling portions.

13. The rotating module of claim 12, wherein the engaging portions are formed at interior circumferences of the both end portions of the connector so as to be engaged with the teeth at the exterior circumferences of the coupling portions.

14. The rotating module of claim 6, wherein the elastic member is a circular plate spring.

15. The rotating module of claim 1, wherein the first connecting section is connected to the base frame through a fixing plate, and a bearing is interposed between the fixing plate and the first connecting section.

* * * * *